June 17, 1930.                J. W. PECK                1,765,031
                              DITCH CLEANER
                           Filed Aug. 25, 1927
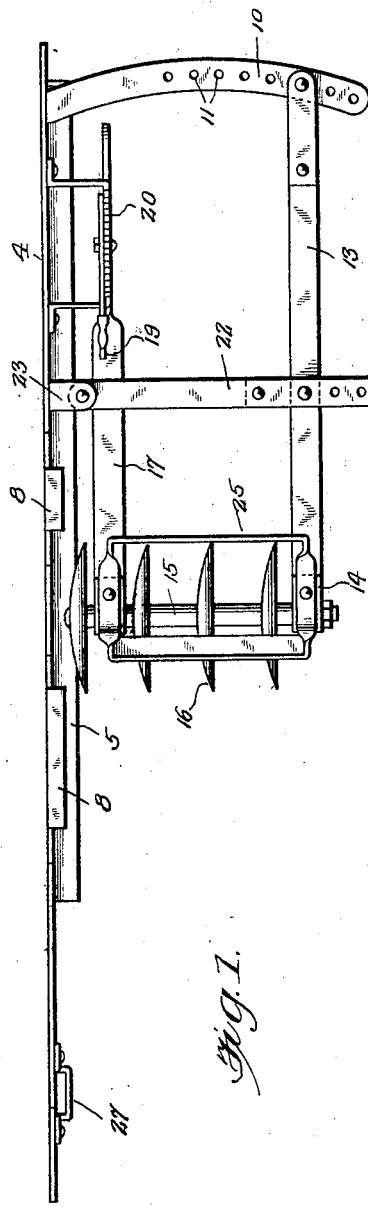
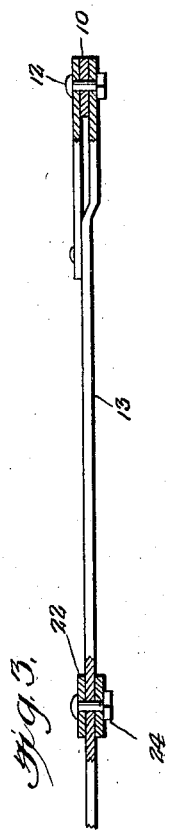
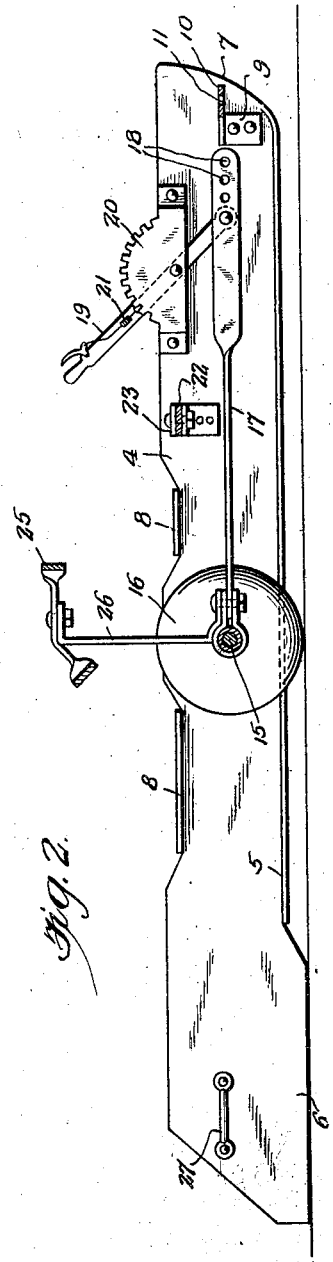
INVENTOR.
J. W. Peck,
BY
Bernard F. Garvey
ATTORNEY.

Patented June 17, 1930

1,765,031

UNITED STATES PATENT OFFICE

JOHN WILLIAM PECK, OF FRESNO, CALIFORNIA

DITCH CLEANER

Application filed August 25, 1927. Serial No. 215,407.

This invention consists of a ditch cleaner and is especially adapted for use in relieving irrigating ditches from vegetation, such as water grass, which latter tends to retard the flow of water through the ditch.

An object of the invention is to provide a machine which longitudinally traverses the ditch and is positively held from lateral displacement on the sides of the ditch to effectively cut the vegetation and urge the loose dirt up the bank of the ditch.

Another object of the invention is to provide a machine of this character which is easy to operate and will maintain its position on the side of the ditch bank during operation, the ground engaging elements being adjustable so as to vary the path traversed thereby, at the option of the user.

Other objects of the invention will be apparent from the following description of the present preferred form of the invention, taken in connection with the accompanying drawings, wherein Figure 1 is a top plan view of a ditch cleaner constructed in accordance with the present invention;

Figure 2 is a longitudinal sectional view of the device showing the guide bar and ground engaging discs in side elevation; and, Figure 3 is a detail fragmentary sectional view showing the manner of connecting one of the disc engaging bars with the draft bar.

The device of the present invention is especially adapted for use in cleaning ditches of vineyards which frequently become clogged by vegetation, such as Bermuda grass, as well as other extraneous materials. This condition prevents use of the ditch banks for drying the fruit. The present invention is designed to give the proper angle to the sides of the ditch in order that the fruit holding trays, such as are customarily employed in drying raisins, may be mounted on the sides of the ditch to get the full benefit of the sun's ray.

The device of the present invention embodies a guide 4 which, in the present instance, consists of an elongated metal plate, the lower marginal edge of which has a portion thereof bent inwardly at right angles to provide a runner 5, the balance of the same margin being permitted to extend downwardly below the plane of the runner to provide a ground engaging blade 6. The forward end of the guide is rounded, as indicated at 7, to facilitate movement of the same through the ditch. The upper marginal edge of the guide has portions thereof bent inwardly in parallel relation to the runner 5 to provide steps 8.

Fixedly secured to the inner wall of the guide 4 at the front end of the latter is one end 9 of a draft bar 10, the free end of the latter extending outwardly from the guide and being provided with a series of openings 11, any one of which is adapted for engagement with a clevis or like instrumentality used for engaging draft animals or motive power, if desired, with the draft bar. The openings 11 extend from a point approximately midway the ends of the draft bar outwardly to the free end of the latter, the outermost openings being adapted for the reception of a bolt 12, which pivotally connects one end of a disc supporting and adjusting bar 13 thereto. The bar 13 extends rearwardly from the draft bar in parallel relation to the guide 4 and has the rear end thereof pivotally engaged with a bracket 14 which latter encircles a disc carrying axle 15. The discs are indicated in the drawings at 16 and may be of any desired number, in the present instance four being shown to illustrate the application of the invention. The inner end of the axle 15 is engaged by one end of a bar 17 which latter likewise extends in parallel relation to the guide plate 4 and has the forward end thereof provided with a series of openings 18, any one of which may be pivotally engaged by one end of an operating lever 19. The lever 19 is pivotally mounted on a segmental rack 20 which is supported by the guide plate 4, as illlustrated to advantage in Figure 2. The lever 19 may be held at any desired position on the segmental rack 20 by a lever carried pawl 21 which operates in a manner well-known in the art In order to prevent sagging of the bar 13 and further to positively hold the latter in any pre-determined position, a suitable brace 22 is provided, the inner end of which is pivotally mounted on a bracket 23, carried by the guide 4 to the rear of the segmental rack 20. The outer end of the brace is provided with a series of openings which complement a corresponding opening formed in the bar 13 and receives therethrough a bolt 24 through the medium of which the bar 13 is secured from displacement. Lateral adjustment of the bar may be effected by removal of the bolt 24 and likewise removal of the bolt 12, if desired. Correspondingly the discs 16 are laterally adjusted with respect to the guide runner 4. By reason of the brace 22, the bar 13 is normally retained in a fixed position while the bar 17 is floatingly mounted and the movement thereof controlled by the lever 19, in order to swing the inner end of the axle 15 to correspondingly adjust the position of the series of discs mounted thereon. The floating bar 17 is pivotally engaged with a bracket which encircles the axle 15 as illustrated in Figure 2 of the drawings.

Working conditions make it necessary at times to exert pressure downwardly on the discs 16 in order to cause the latter to penetrate the ditch and for this purpose a supporting frame 25 is provided which may be of any desired configuration and is supported by vertical standards 26 which are superimposed on the bars 13 and 17 and are secured thereto by the same bolts which engage said bars with the axle brackets. The frame 25 may be used to carry any kind of a weight, or if desired the operator may ride on the device to cause the discs 16 and the blade 6 of the guide to penetrate the earth. The operator may support one foot on one of the steps 8 and the other foot on the frame 25 and ride along on the cleaner, so long as it is necessary to weight the latter to cause effective penetration.

In use of this device, the guide 4 is positioned in the bottom of the ditch where the blade 6 will penetrate the bottom of the latter to prevent lateral displacement of the guide. When the guide is in this position, the discs 16 will be positioned on one bank of the ditch. The angularity at which the discs 16 should be disposed will be determined by the operator, depending upon the inclination of the bank of the ditch and the depth of the latter. As the discs pass over the bank, it is apparent that vegetation will be cut thereby and where the dirt on the bank is loose, it will not be dragged along by the discs, but will be leveled. It is well known that irrigating ditches especially in vineyards are usually substantially V-shaped and with the device of the present invention where the banks of the ditch have become undulated, the discs will break up the undulations and make the surface relatively straight. It is of course understood that both sides of the bank may be cultivated by the device of the present invention by simply reversing the operation of the cleaner when it reaches the end of the ditch and to facilitate this operation a handle 27 is mounted on the rear end of the guide 4. However, if desired, both sides of the guide 4 may be equipped with mechanism as illustrated in the drawings in order to simultaneously cultivate both banks of the ditch. This is accomplished by duplicating the mechanism shown in the drawings and associating it with the guide in a manifest manner. Furthermore, the number of discs 16 may be increased by substituting a longer axle so as to accommodate the number of discs to be used. The number of discs employed depends upon the area to be covered.

Although I have above described what I consider to be the preferred form of this invention, I am of course, aware that various changes may be made in the device, especially in the details of construction, proportion and arrangement of the parts, within the scope of the claims hereto appended.

What is claimed is:—

1. A ditch cleaner including a guide plate, a portion of the lower margin of which is bent at right angles to provide a runner and the remainder of said margin extended below the runner to provide an earth penetrating blade, and earth penetrating discs carried by said guide plate.

2. A ditch cleaner including a guide plate adapted for use in the bottom of the ditch and equipped with an earth engaging portion to penetrate the bottom of the latter, a series of discs adjustably mounted on the guide, and a weight supporting frame mounted above said discs to urge the latter into the bank of the ditch, substantially as described.

3. A ditch cleaner including an elongated bar, one margin of which is formed to provide a runner which issues into a blade projecting below the latter, ground engaging discs mounted on the bar, the peripheries of which extend beyond the runner and terminate in the horizontal plane of the blade margin.

JOHN WILLIAM PECK.